US011107242B2

(12) United States Patent
Fitzgibbon et al.

(10) Patent No.: US 11,107,242 B2
(45) Date of Patent: Aug. 31, 2021

(54) DETECTING POSE USING FLOATING KEYPOINT(S)

(71) Applicant: Microsoft Technology Licensing, LLC, Redmond, WA (US)

(72) Inventors: Andrew William Fitzgibbon, Cambridge (GB); Erroll William Wood, Cambridge (GB); Jingjing Shen, Cambridge (GB); Thomas Joseph Cashman, Cambridge (GB); Jamie Daniel Joseph Shotton, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 71 days.

(21) Appl. No.: 16/362,390

(22) Filed: Mar. 22, 2019

(65) Prior Publication Data
US 2020/0226786 A1 Jul. 16, 2020

Related U.S. Application Data

(60) Provisional application No. 62/791,679, filed on Jan. 11, 2019.

(51) Int. Cl.
*G06T 7/73* (2017.01)
*G06T 7/246* (2017.01)
(Continued)

(52) U.S. Cl.
CPC .................. *G06T 7/75* (2017.01); *G06N 3/08* (2013.01); *G06N 20/20* (2019.01); *G06T 7/251* (2017.01);
(Continued)

(58) Field of Classification Search
CPC ............... G06K 9/00342; G06K 9/629; G06K 9/00348; G06T 2207/20084;
(Continued)

(56) References Cited

U.S. PATENT DOCUMENTS 9,501,693 B2 * 11/2016 Sarratt ................. G06K 9/6282
10,691,943 B1 * 6/2020 Ferstl ................... G06N 3/0445
(Continued)

OTHER PUBLICATIONS

Gabriele et al., "Real Time Head Pose Estimation with Random Regression Forests", IEEE, Jun. 2011 (Year: 2011).*
(Continued)

*Primary Examiner* — Dung Hong

(57) ABSTRACT

In various examples there is an apparatus for detecting position and orientation of an object. The apparatus comprises a memory storing at least one frame of captured sensor data depicting the object. The apparatus also comprises a trained machine learning system configured to receive the frame of the sensor data and to compute a plurality of two dimensional positions in the frame. Each predicted two dimensional position is a position of sensor data in the frame depicting a keypoint, where a keypoint is a pre-specified 3D position relative to the object. At least one of the keypoints is a floating keypoint depicting a pre-specified position relative to the object, lying inside or outside the object's surface. The apparatus comprises a pose detector which computes the three dimensional position and orientation of the object using the predicted two dimensional positions and outputs the computed three dimensional position and orientation.

20 Claims, 14 Drawing Sheets

(51) Int. Cl.
*G06N 20/20* (2019.01)
*G06N 3/08* (2006.01)

(52) U.S. Cl.
CPC .............. *G06T 2207/20081* (2013.01); *G06T 2207/20084* (2013.01); *G06T 2207/30196* (2013.01); *G06T 2207/30204* (2013.01)

(58) Field of Classification Search
CPC . G06T 2207/20081; G06T 2207/30204; G06T 19/006
See application file for complete search history.

(56) References Cited

U.S. PATENT DOCUMENTS

| 10,706,584 | B1* | 7/2020 | Ye .............................. G06F 3/011 |
| 2010/0332427 | A1* | 12/2010 | Ha ........................... G06T 7/246 |
| | | | 706/12 |
| 2012/0088544 | A1* | 4/2012 | Bentley .................. A63B 69/36 |
| | | | 455/556.1 |
| 2013/0225309 | A1* | 8/2013 | Bentley .............. G06K 9/00342 |
| | | | 473/266 |
| 2015/0192413 | A1* | 7/2015 | Bellusci ............... A61B 5/1123 |
| | | | 702/152 |
| 2017/0004358 | A1* | 1/2017 | Bose .................... G06K 9/0053 |
| 2018/0211404 | A1* | 7/2018 | Zhu .......................... G06T 7/246 |
| 2019/0103033 | A1* | 4/2019 | Lu Hill ..................... G09B 5/02 |
| 2019/0220993 | A1* | 7/2019 | Li .............................. G06T 7/73 |
| 2019/0361589 | A1* | 11/2019 | Yerli ....................... G06F 3/011 |
| 2020/0205697 | A1* | 7/2020 | Zheng .................. G08B 29/186 |

OTHER PUBLICATIONS

Han, et al., "Online Optical Marker-based Hand Tracking With Deep Labels", In Proceedings of the ACM Transactions on Graphics, vol. 37, Issue 4, Jul. 30, 2018, 10 Pages.

"International Search Report and Written Opinion Issued in PCT Application No. PCT/US2019/067696", dated Mar. 30, 2020, 10 Pages.

Suwajanakorn, et al., "Discovery of latent 3D keypoints via end-to-end geometric reasoning", In Proceedings of the 32nd International Conference on Neural Information Processing Systems, Dec. 3, 2018, 14 Pages.

* cited by examiner

DETECTING POSE USING FLOATING KEYPOINT(S)

CROSS-REFERENCE TO RELATED APPLICATION

This application claims the benefit of U.S. Provisional Application No. 62/791,679, filed on Jan. 11, 2019, which is incorporated herein by reference.

BACKGROUND

The pose of an object is the position and orientation of the object with respect to world coordinates and comprises six degrees of freedom. Computing the pose of an object from observed sensor data such as images is useful for many applications such as natural user interfaces, robotics, computer games, medical equipment, self-driving cars and augmented reality. Often the pose of the object is to be computed in real time to enable the pose data to be used for accurate control of downstream equipment such as a self-driving car, medical device, robot or other equipment.

Many existing approaches to detecting pose of an object from captured sensor data suffer from inaccuracy, especially where pose is to be computed using a resource constrained device such as a smart phone, wearable computer, or other resource constrained device, in real time.

The embodiments described below are not limited to implementations which solve any or all of the disadvantages of known pose detection mechanisms.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is an apparatus for detecting position and orientation of an object. The apparatus comprises a memory storing at least one frame of captured sensor data depicting the object. The apparatus also comprises a trained machine learning system configured to receive the frame of the sensor data and to compute a plurality of two dimensional positions in the frame. Each predicted two dimensional position is a position of sensor data in the frame depicting a keypoint, where a keypoint is a pre-specified 3D position relative to the object. At least one of the keypoints is a floating keypoint depicting a pre-specified position relative to the object, lying inside or outside the object's surface. The apparatus comprises a pose detector which computes the three dimensional position and orientation of the object using the predicted two dimensional positions and outputs the computed three dimensional position and orientation.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As mentioned above, the pose of an object is the position and orientation of the object with respect to world coordinates and comprises six degrees of freedom. In some parameterizations, the six degrees of freedom are made up of position with respect to three perpendicular axes (typically denoted x, y and z) and orientation with respect to three perpendicular axes (typically denoted as yaw, pitch and roll), although other parameterizations are possible.

The present technology uses keypoints to detect pose of an object. In the present technology a keypoint is a specified position on, in or outside the object. The term "floating keypoint" is used herein to refer to a keypoint which is outside the object, or inside the object, and at a specified location relative to the object. The term "regular keypoint" is used herein to refer to a keypoint which is on the surface of the object.

The present technology detects pose of an object. The object is any real world object which is articulated, or not articulated, deformable or not deformable, and which exists in an environment in a variety of possible poses. A non-exhaustive list of objects for which pose is detectable using the present technology is: human body, hand, head and shoulders, book, fish, smart phone, laptop computer, mug, or other real world object.

The present technology uses one or more frames of captured sensor data depicting the object in the environment. The frames of captured sensor data are images or 3D point clouds from any suitable capture device.

The inventors have recognized that inaccuracies in detected pose often occur where regular keypoints computed from captured sensor data depicting the object have ambiguity due to the camera viewpoint and symmetry of the object. The inventors have found that by using one or more floating keypoints significant improvements in accuracy are found. In an example, hand tracking technology exhibits a 27% improvement in median joint position error as described in more detail below.

Figure 1:
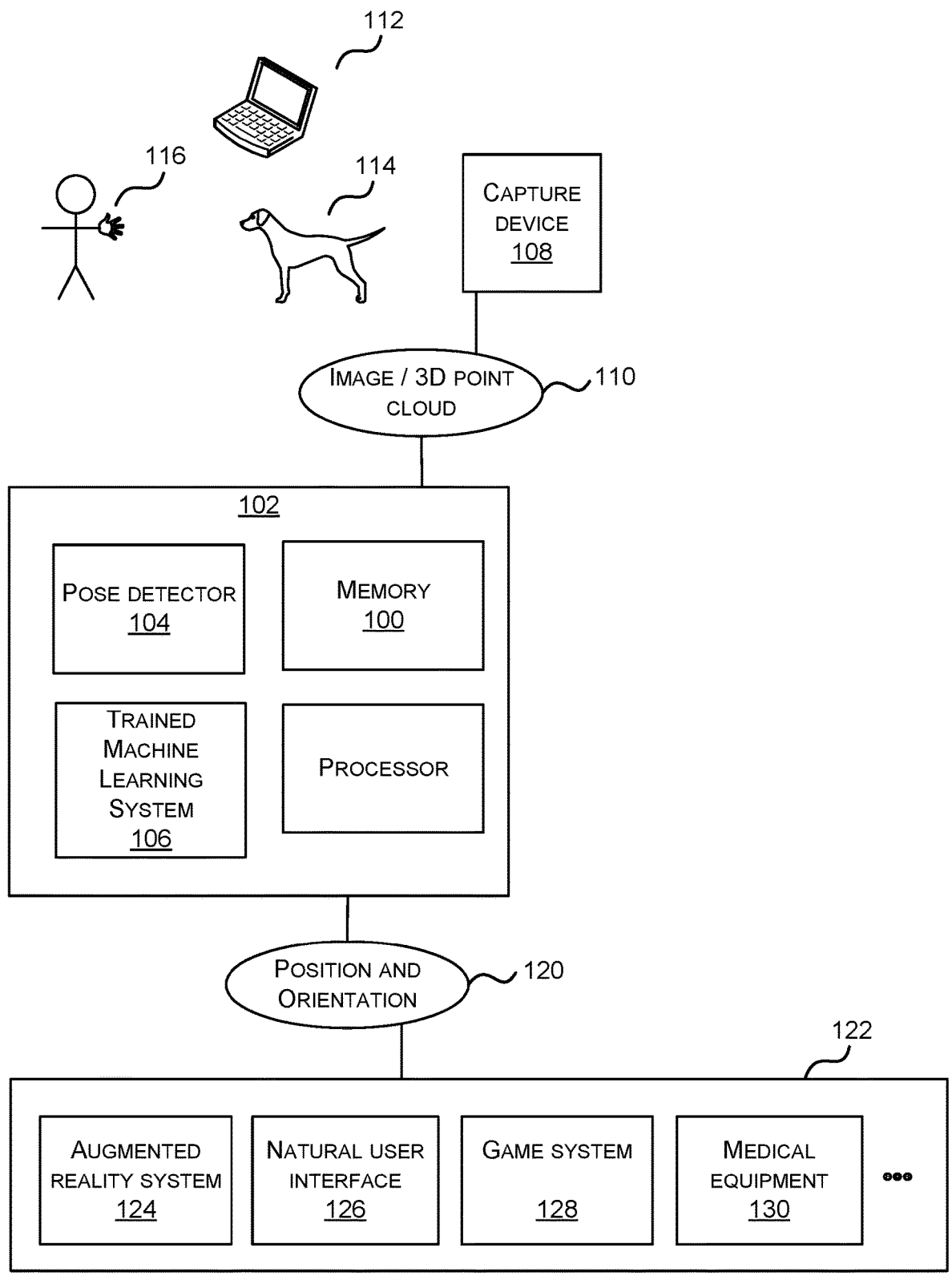
FIG. 1 is a schematic diagram of an apparatus 102 for detecting pose of an object.

FIG. 1 shows an apparatus 102 for detecting pose of an object in an environment from captured sensor data. FIG. 1 shows the object as being a laptop computer 112, a dog 114 or a person's hand 116 in order to illustrate the technology although these examples of objects are not intended to be limiting. The object can be any object as defined earlier in this document. The capture device 108 captures frames of sensor data such as images, 3D point clouds, range maps, medical volumes, or other frames of sensor data depicting the object. Each frame is two dimensional or three dimensional and positions within a frame are denoted using two dimensional coordinates, three dimensional coordinates, column and row indexes, or in other ways. Each location within a frame comprises sensor data values such as intensity values, which depict part of a surface in the real world. In the case that the captured sensor data is a point cloud it is converted to a 3D or 2D array prior to processing.

The apparatus 102 is computer implemented and comprises at least a pose detector 104, a memory 100, a processor 118 and a trained machine learning system 106. Other components of the apparatus 102 are described below with reference to FIG. 11 and are not shown in FIG. 1 for clarity. FIG. 1 is schematic and in practice the pose detector 104 and trained machine learning system 106 are within the memory 100 and/or processor 118. The apparatus 102 computes position and orientation 120 of the object depicted in the frame of sensor data. The computed position and orientation 120 is output to a downstream system 122 such as an augmented reality system 124, a natural user interface 126, a game system 128, medical equipment 130 or other downstream system which uses the position and orientation values to understand the object in the environment and take appropriate actions.

The trained machine learning system 106 has been trained to predict two dimensional positions in the frame of sensor data each of which depicts a keypoint. At least one of the keypoints is a floating keypoint. In an example, the machine learning system predicts two dimensional positions of a specified number of keypoints, such as four keypoints or three keypoints or more than four keypoints. The machine learning system comprises any suitable machine learning technology such as a neural network, a random decision forest, a support vector machine, or other machine learning technology. The machine learning system has been trained using frames of sensor data which are empirical or synthetic and where image elements of the frames of sensor data are labelled as depicting a keypoint or not.

The pose detector 104 operates in an unconventional manner to achieve more accurate pose detection in an efficient manner suitable for execution on resource constrained devices such as smart phones and wearable computers. Having said that, the technology is deployed on personal computers with access to cloud computing resources in some cases, so that the technology is not restricted to resource constrained devices.

The pose detector 104 and the trained machine learning system 106 improve the functioning of the underlying computing device because they enable more accurate pose detection in an efficient manner such as for use on resource constrained devices.

Alternatively, or in addition, the functionality of the trained machine learning system 106 and the pose detector 104 described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2A:
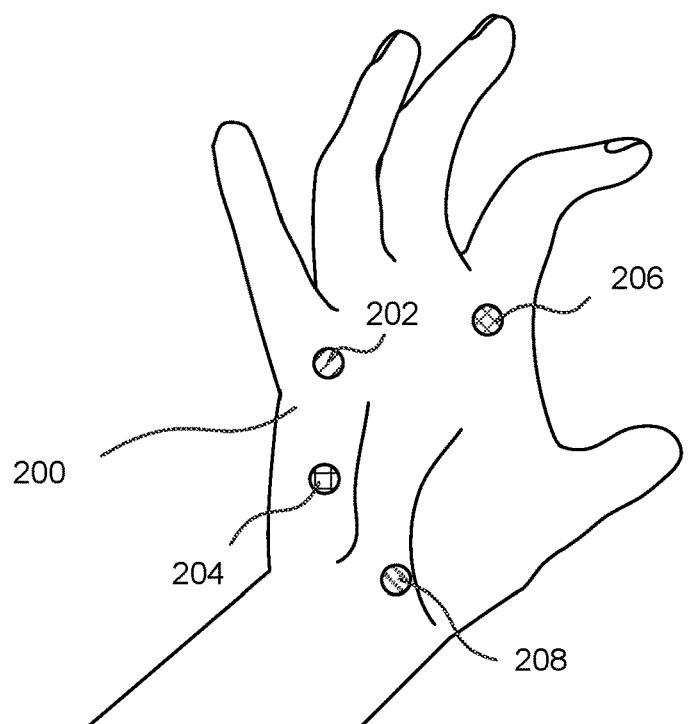
FIGS. 2A to 2D show a hand with keypoints, one of which is a floating keypoint and where the hand is in each of four different poses.

FIG. 2A is a schematic diagram of an object, which in this case is a hand 200, where the hand is raised in the air with the palm facing the viewer and with the fingers generally outstretched. The thumb and forefinger are moved towards one another to form a pinch gesture. Four keypoints are indicated as small circles 202, 204, 206, 208. Three of the keypoints, 202, 206, 208 are regular keypoints and one of the keypoints 204 is a floating keypoint. The floating keypoint is at a defined location, such as around two to five centimeters above a center of the back of the hand, where the back of the hand is opposite the palm of the hand. The regular keypoints are at defined locations such as on the knuckle where the little finger joins the hand (see keypoint 202), on the knuckle where the forefinger joins the hand (see keypoint 206), in the center of the wrist where the wrist joins the hand (see keypoint 208).

Figure 2B:
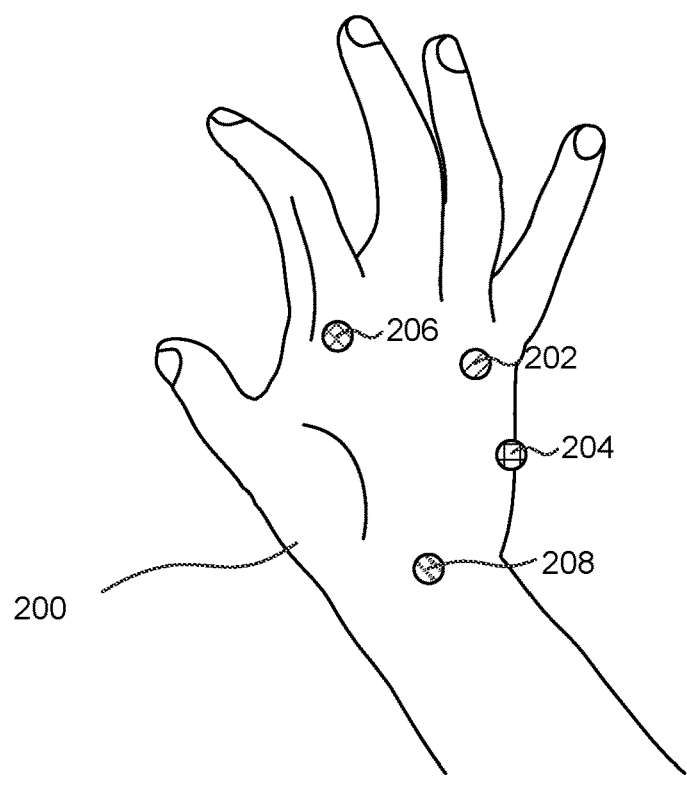

FIG. 2B is a schematic diagram of the hand of FIG. 2A where the palm is facing away from the viewer but otherwise the hand is making the same pinch gesture as in FIG. 2A.

Figure 2C:
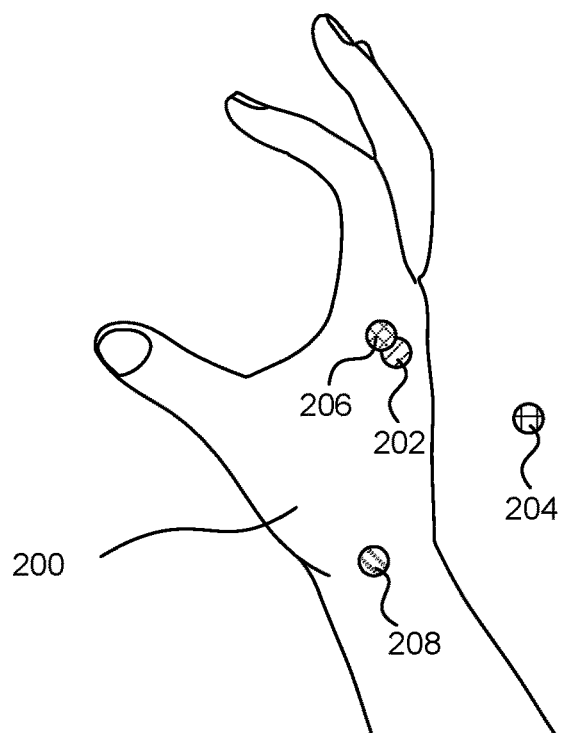
Figure 2D:
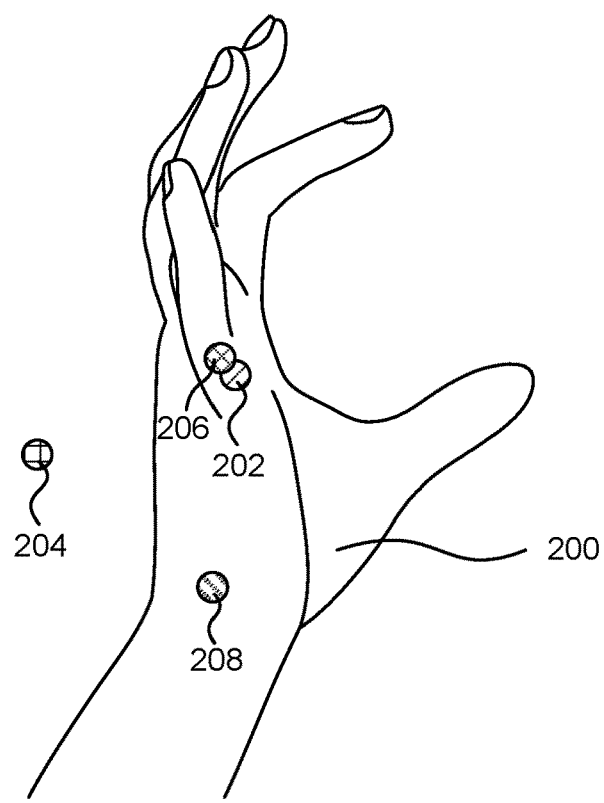

In the situations of FIGS. 2A and 2B the positions of the three regular keypoints in a frame of captured sensor data is enough information to enable pose of the hand to be computed accurately using the well-known P3P algorithm which is explained later in this document. However, in the situations of FIGS. 2C and 2D the orientation of the hand is substantially ambiguous given the same information (i.e. given the positions of the three regular keypoints in the frame of captured sensor data). In FIGS. 2C and 2D the orientation of the hand is substantially ambiguous (as opposed to fully ambiguous) because the pose detector is unaware that the ambiguity exists and simply picks one of the two orientations even though the orientation it picks may be inaccurate. FIG. 2C shows a side view of the raised hand such that the three regular keypoints are generally collinear. The palm of the hand is facing the left side of the page. FIG. 2D shows another side view of the raised hand, this time where the palm is facing the right hand side of the page. Using only the positions of the regular keypoints in the frame of captured sensor data, it is not possible to tell the orientation of the hand e.g. whether the palm is facing the left side or the right side of the page. The inventors have recognized that by taking into account a floating keypoint, such as floating keypoint 204, the ambiguity is resolved and it is possible to determine, using the 2D positions of the four keypoints 202-208 in the frame of captured data, the orientation of the hand. However, it is not straightforward to detect the 2D position of a floating keypoint in a frame of captured sensor data, since there are no visual features in the frame which mark the floating keypoint. In contrast, a regular keypoint can be detected by looking for visual features such as lines, edges, blobs, color patterns, texture or other specified features which characterize the regular keypoint. The inventors have recognized that by using a trained machine learning system it is possible to predict the position, in a 2D frame of captured sensor data, which corresponds to a floating keypoint and/or a regular keypoint. The trained machine learning system provides an effective and efficient way of finding the 2D positions in the frame which depict keypoints (both regular and floating keypoints).

Figure 2E:
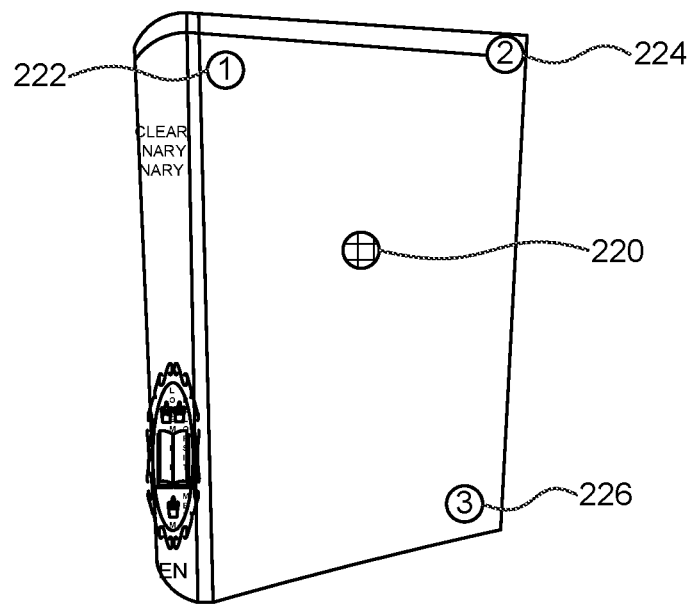
FIG. 2E shows an image of a book with the front cover and part of the spine visible.

FIG. 2E shows an image of a book with the front cover visible and part of the spine visible. Four keypoints are indicated as small circles 220, 222, 224, 226. Three of the keypoints, 222, 224, 226 are regular keypoints and one of the keypoints 220 is a floating keypoint. The floating keypoint is at a defined location, such as around two to five centimeters above a center of the front cover of the book. The regular keypoints are at defined locations such as on the corners of the front cover of the book.

Figure 2F:
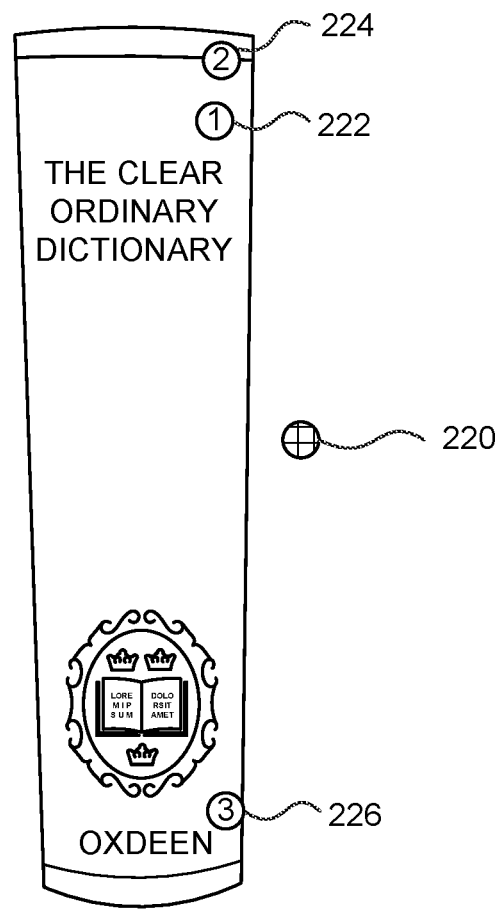
FIG. 2F shows an image of a spine of the book of FIG. 2E.

In the situation of FIG. 2E the orientation of the book is known from the 2D locations of the regular keypoints and there is no need for the location of the floating keypoint 220 to be used to resolve orientation ambiguity. However, in the situation of FIG. 2F the orientation of the book is ambiguous from the 2D locations of the regular keypoints alone (since it is not known whether the book is standing upright or standing upside down). Here the 2D location of the floating keypoint 220 enables the ambiguity in the orientation to be resolved.

Figure 3A:
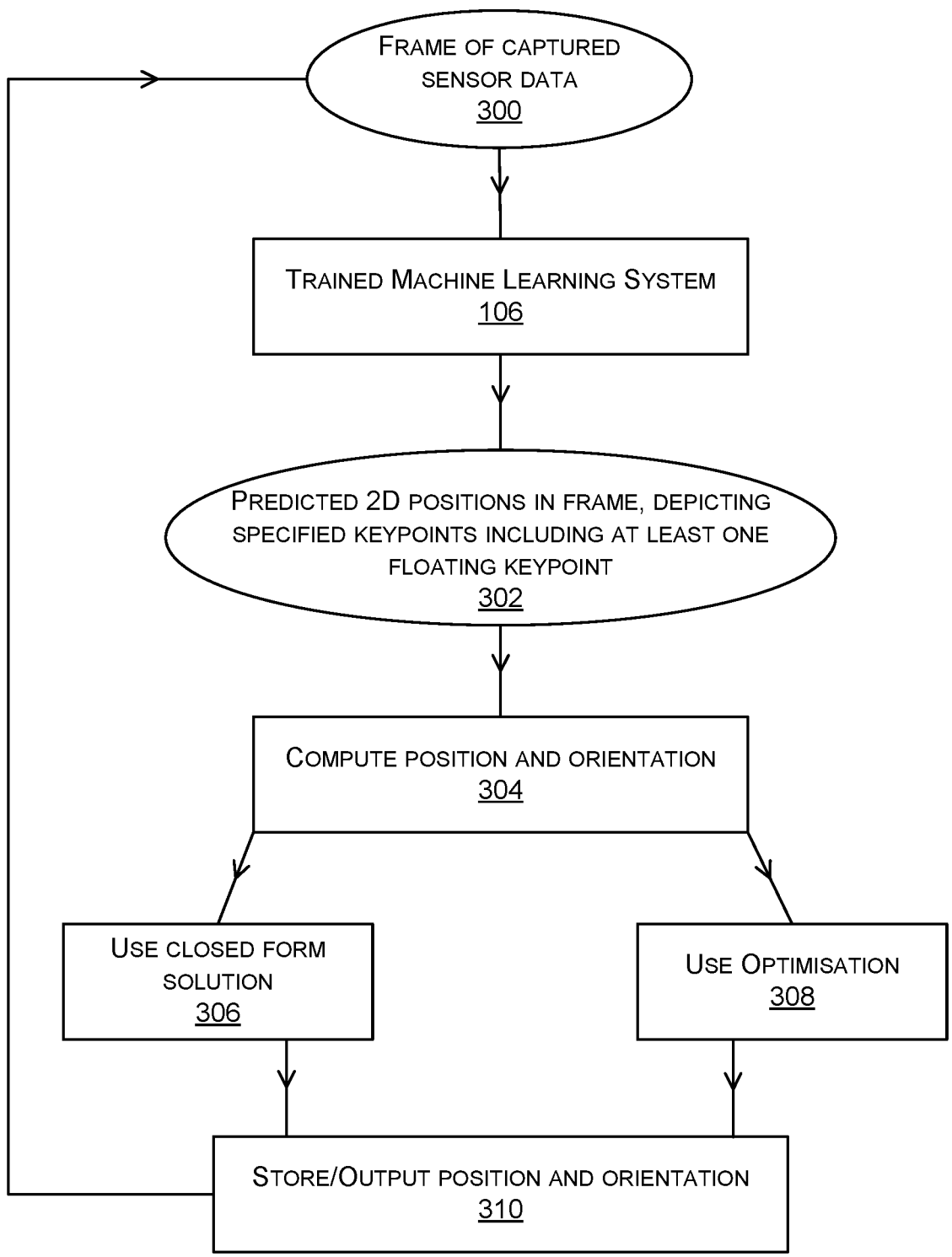
FIG. 3A is a flow diagram of a method detecting pose using the apparatus of FIG. 1.

FIG. 3A is a flow diagram of a method of operation at the apparatus 102. A frame of captured sensor data is received 300 such as an image, a depth map, a 3D point cloud which is converted to a 2D or a 3D array, or other frame of captured sensor data. The frame is input to a trained machine learning system 106 which computes 302 predicted 2D positions in the frame, depicting specified keypoints including at least one floating keypoint. In an example, the machine learning system predicts a likelihood, for each image element of the frame, that the image element depicts a first keypoint. It does the same for a second keypoint, and for each of the keypoints specified by an operator (that is, the number of keypoints and their position is specified in advance by an operator depending on the application domain and needs of the downstream system).

The predicted 2D positions are input to the pose detector 104 which computes the pose (i.e. the position and orientation) of the object using the predicted 2D positions. In some cases the pose detector uses a closed form solution 306 to compute the pose such as by using a well-known perspective number point (PnP) algorithm as explained below. In some cases the pose detector uses a optimization 308 to compute the pose.

A PnP algorithm takes a plurality, n, of 3D points in a reference frame of the object together with their corresponding 2D image projections. In addition, the PnP algorithm knows the intrinsic camera parameters such as the camera focal length, principal image point and skew parameter. The task of the PnP algorithm is to find the values of the matrix R and vector T (which express the rotation and translation of the object to convert it from object coordinates to world coordinates, and which give the pose of the object in world coordinates i.e. its position and orientation) from the following well known perspective projection model for cameras:

$$sp_c = K[R|T]p_o$$

Which is expressed in words as, a scale factor s, times one of the image points is equal to the matrix of intrinsic camera parameters K times the rotation R and translation T of the object times the corresponding object point (expressed in homogeneous coordinates). A system of simultaneous equations is built up using the above perspective projection model and each of the correspondences (pairs of 2D image points depicting keypoints and 3D keypoint positions in object coordinates). The system of simultaneous equations is solved to find the value of R and T. When n is three the P3P algorithm yields good working solutions although in some cases more than one possible solution is found. Where there is more than one possible solution, one of the solutions is selected. The selection is done at random, or by using additional information from the frame of captured sensor data, or by using historical information from previous frames where the frame is in a stream of frames. In some cases a fourth correspondence is used to remove ambiguity thus creating a P4P algorithm. In various examples of the present technology, a floating keypoint is used to remove the ambiguity such as floating keypoint 204 in FIGS. 2A to 2D. In an example the P4P algorithm is used with double-precision which is found to give particularly robust results.

Where the pose detector uses a optimization 308 to compute the pose, the optimizer minimizes an energy function such as:

$$_{R,T}^{min}\Sigma_{i=1}^{n}D(p_i,\pi(R,K_i+T)).$$

Which is expressed in words as the minimum over possible 6 degree of freedom values of the rotation and translation of the object (i.e. the position and orientation of the object in world coordinates) is equal to the sum over all the available correspondences i of a measure D of the difference between the image point $p_i$, and the result of a camera projection function $\pi$ applied to the keypoint $K_i$ (after it has been rotated by matrix R) plus the translation T. Any suitable well known optimization process is used such as gradient descent or Newton's method with damping.

Once the pose detector 104 has computed the pose the position and orientation are stored and/or output 310 and the process repeats for another frame of captured sensor data 300.

Figure 3B:
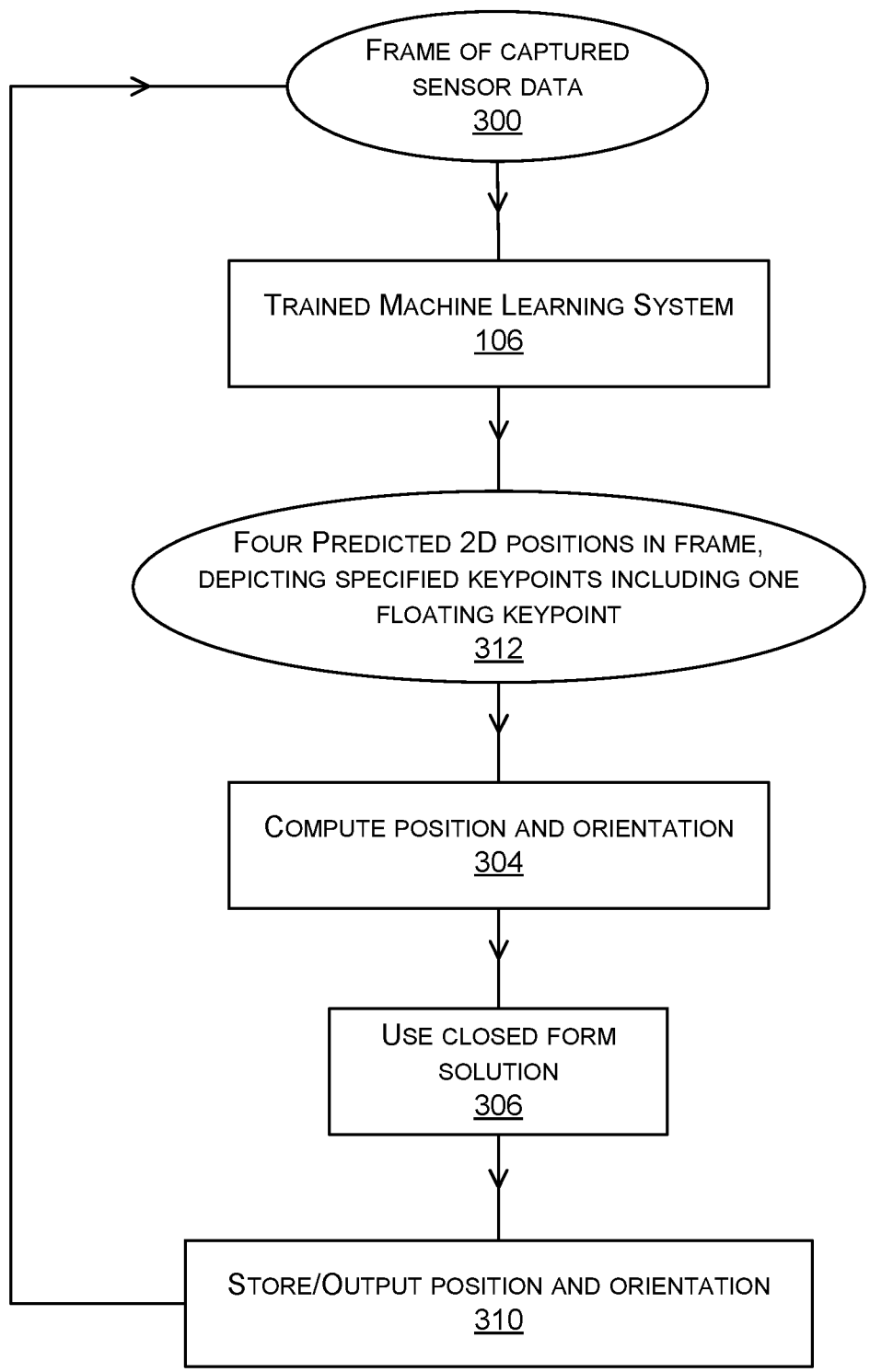
FIG. 3B is a flow diagram of a method of detecting pose using four keypoints, one of which is a floating keypoint.

FIG. 3B is a flow diagram of a method of operation at the apparatus 102 where four keypoints are used, one of which is floating and three of which are regular. A frame of captured sensor data is received 300 such as an image, a depth map, a 3D point cloud which is converted to a 2D or a 3D array, or other frame of captured sensor data. The frame is input to a trained machine learning system 106 which computes 312 predicted 2D positions in the frame, depicting four specified keypoints including one floating keypoint.

The four predicted 2D positions are input to the pose detector 104 which computes the pose (i.e. the position and orientation) of the object using a perspective number point (P4P) algorithm as explained below.

The P4P algorithm takes 4, 3D points in a reference frame of the object together with their corresponding 2D image projections. In addition, the P4P algorithm knows the intrinsic camera parameters such as the camera focal length, principal image point and skew parameter. The task of the P4P algorithm is to find the values of the matrix R and vector T (which express the rotation and translation of the object to convert it from object coordinates to world coordinates, and which give the pose of the object in world coordinates i.e. its position and orientation) from the following well known perspective projection model for cameras:

$sp_c = K[R|T]p_o$

Which is expressed in words as, a scale factor s, times one of the image points is equal to the matrix of intrinsic camera parameters K times the rotation R and translation T of the object times the corresponding object point (expressed in homogeneous coordinates). A system of simultaneous equations is built up using the above perspective projection model and each of the correspondences (pairs of 2D image points depicting keypoints and 3D keypoint positions in object coordinates). The system of simultaneous equations is solved to find the value of R and T. The P4P algorithm is used with double-precision which is found to give particularly robust results.

Once the pose detector 104 has computed the pose the position and orientation are stored and/or output 310 and the process repeats for another frame of captured sensor data 300.

Figure 4:
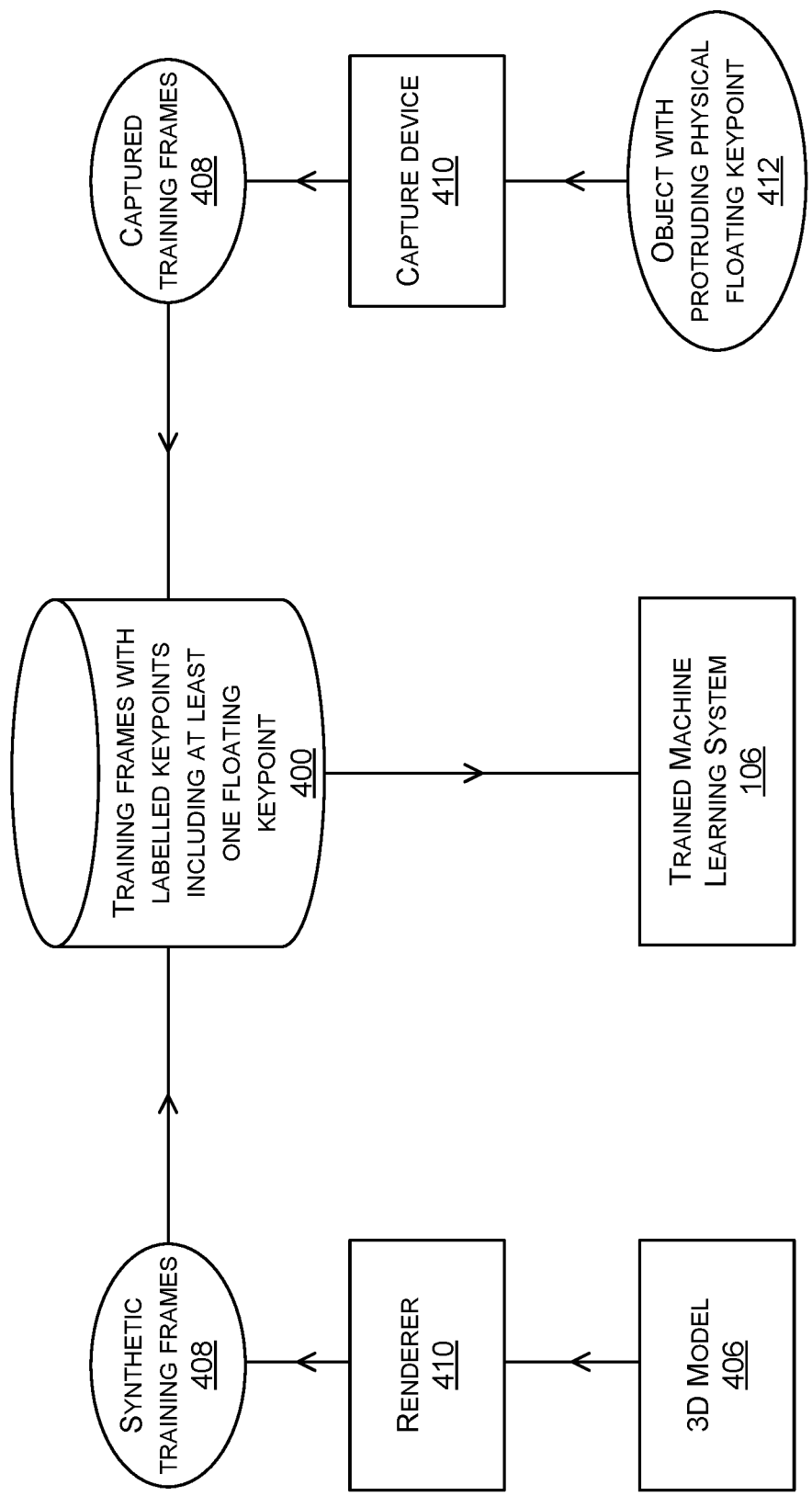
FIG. 4 is a schematic diagram of training data for training a machine learning system.

FIG. 4 is a schematic diagram of a store 400 of training frames with ground truth keypoint data where at least one of the keypoints is a floating keypoint. The training data includes frames depicting objects in a class of objects to be used in the particular task concerned. For example, in the case of hand tracking, the training data includes frames depicting hands of different shapes and sizes, with and without rings, watches, bracelets, finger nail art and other items, and in different positions and orientations optionally with and without occlusions. In the case of body tracking the training data includes frames depicting people of different body shapes and sizes, wearing different clothing, and in different positions and orientations and optionally with and without occlusions. In the case of a smart phone, the training data includes frames depicting different models and types of smart phone, in different positions and orientations and optionally with and without occlusions. The training data in store 400 comprises synthetic training frames, empirical training frames or a combination of synthetic and empirical training frames. The training frames in store 400 are used to create the trained machine learning system 106 as described in more detail below.

Since it is difficult for human judges to accurately label the two dimensional position in an image which depicts a floating keypoint, the training data is synthetic in some examples. Synthetic training frames are generated by rendering the frames from a 3D model 406 of a generic instance of the class of objects using a renderer 404. The generic instance of the class of objects is parameterized and by selecting different values of the parameters many different particular instances of the class of objects are modelled. The particular models are then rendered from to generate the synthetic training frames 402. Occlusions are introduced if required. Since the 3D model 406 used to generate the synthetic training frames 402 is known, and the positions of the keypoints to be used are specified relative to the 3D model, it is possible to label the synthetic training frames 402 with the keypoint data automatically (for both regular and floating keypoints).

It is also possible to generate training data empirically by using a real world object 412 and attaching a physical marker protruding from a surface of the object in order to indicate the location of a floating keypoint. In an example where the class of objects is human hands, the physical marker is mounted on a post on the back of the hand so that it is at a specified location relative to the hand. One or more regular keypoints may be indicated by physical markers on the hand itself. A conventional capture device 410 is used to capture frames 408 of sensor data depicting the hand with the physical markers. Conventional image analysis techniques, such as edge detection, color analysis or others are then used to detect the locations in the captured frame which depict the physical markers.

As mentioned above the trained machine learning system 106 is implemented using any of a variety of suitable machine learning technologies, including but not limited to neural networks, random decision forests, support vector machines and others. An example in which a random decision forest is used is now given.

Figure 5:
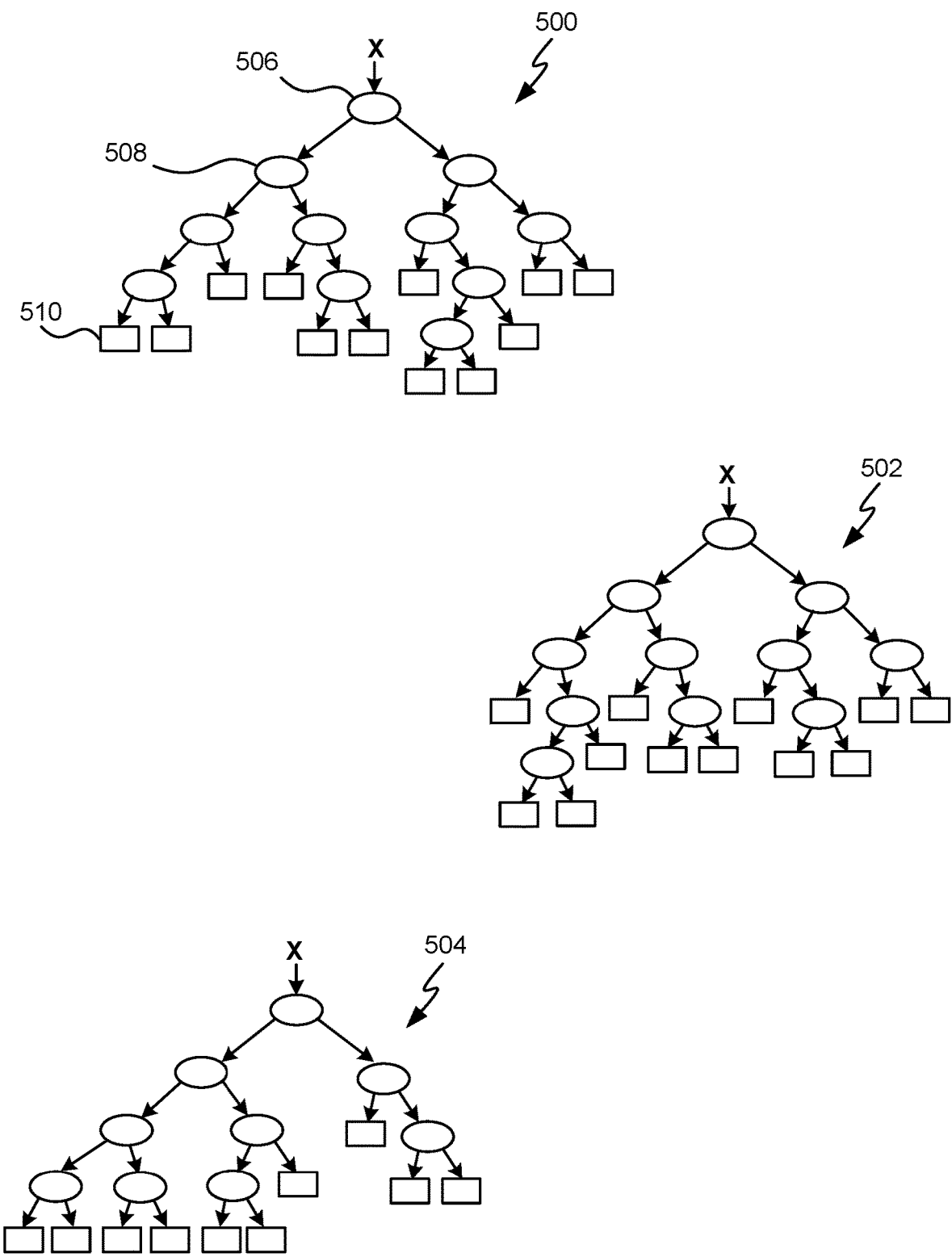
FIG. 5 is a schematic diagram of three random decision trees forming at least part of a random decision forest.

FIG. 5 is a schematic diagram of an example decision forest comprising three decision trees: a first tree 500; a second tree 502; and a third tree 404. Each decision tree comprises a root node (e.g. root node 506 of the first decision tree 500), a plurality of internal nodes, called split nodes (e.g. split node 508 of the first decision tree 500), and a plurality of leaf nodes (e.g. leaf node 510 of the first decision tree 500).

In operation, each root and split node of each tree performs a binary test (or possibly an n-ary test) on the input data and based on the result directs the data to the left or right child node. The leaf nodes do not perform any action; they store accumulated image element keypoint labels indicating whether a given image element of a frame of sensor data depicts one of the specified keypoints or not. In some cases, rather than storing the accumulated labels, probability distributions are stored representing the accumulated keypoint labels.

Figure 6:
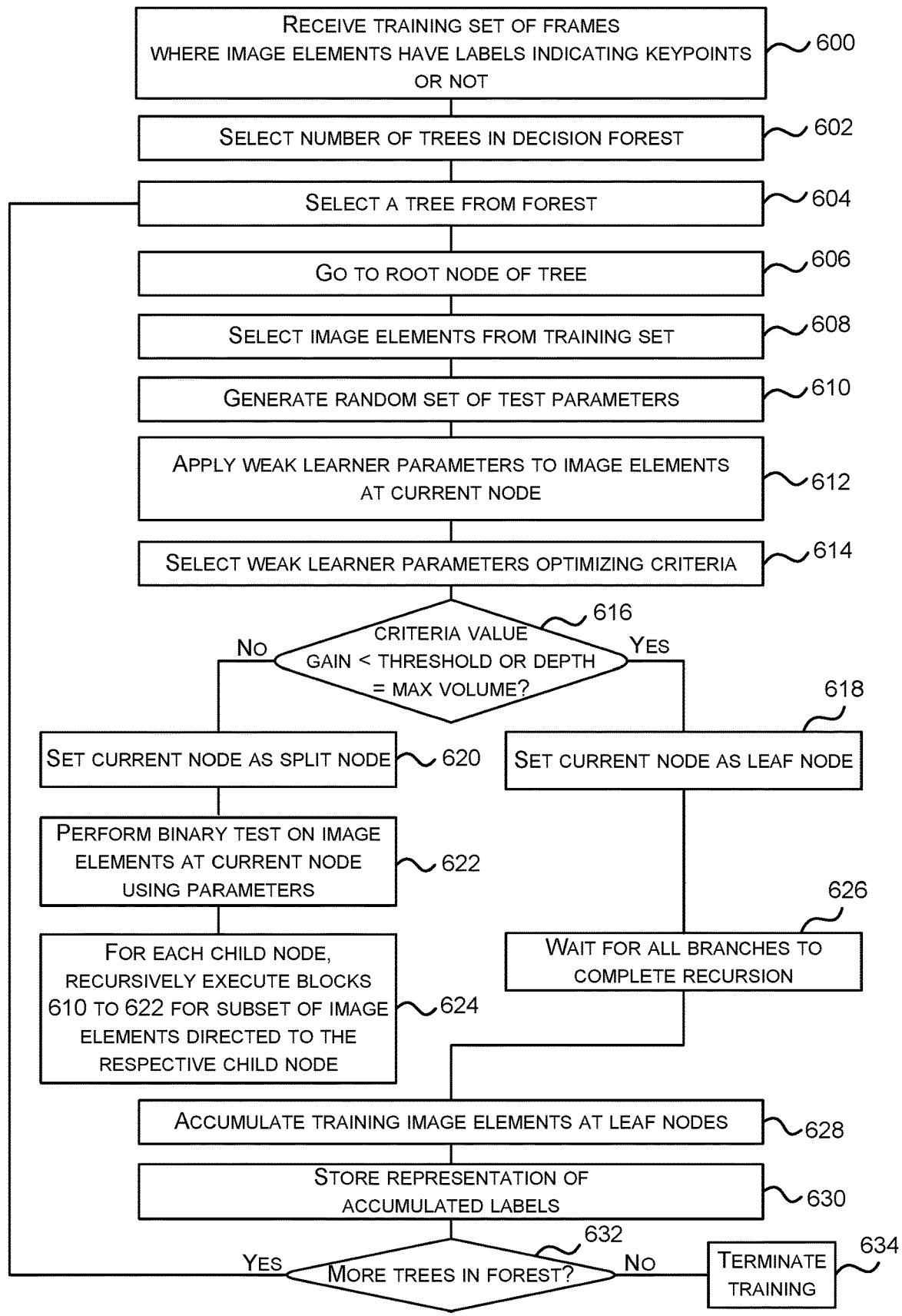
FIG. 6 is a flow diagram of a method of training a random decision forest to predict 2D positions of keypoints including floating keypoints.

FIG. 6 is a flow diagram of a method of training a random decision forest to predict keypoint labels. For example, there is a specified set of keypoints such as the four keypoints of FIGS. 2A to 2D which have known positions relative to the object, and the random decision forest is trained to predict labels for each image element of a frame of captured sensor data. A single image element has a predicted label indicating whether or not it depicts the first keypoint, another predicted label indicating whether or not it depicts the second keypoint and so on for each possible keypoint.

With reference to FIG. 6 a training set of frames of sensor data is received 600 where the image elements have labels indicating the keypoints they depict. The labels are ground truth labels as described above with reference to FIG. 4. A number of trees to be used in the decision forest is selected 602, for example, between 3 and 20 trees.

A decision tree from the decision forest is selected 604 (e.g. the first decision tree 600) and the root node 606 is selected 606. At least a subset of the image elements from each of the training frames are then selected 608. For example, the frame may be filtered to remove noisy or spurious image elements.

A random set of test parameters (also called weak learners) are then generated 610 for use by the binary test performed at the root node as candidate features. In one example, the binary test is of the form: $\xi > f(x; \theta) > \tau$, such that $f(x; \theta)$ is a function applied to image element x with parameters $\theta$, and with the output of the function compared to threshold values $\xi$ and $\tau$. If the result of $f(x; \theta)$ is in the range between $\xi$ and $\tau$ then the result of the binary test is true. Otherwise, the result of the binary test is false. In other examples, only one of the threshold values $\xi$ and $\tau$ can be used, such that the result of the binary test is true if the result of $f(x; \theta)$ is greater than (or alternatively less than) a threshold value. In the example described here, the parameter $\theta$ defines a feature of the image (also referred to as a frame.

A candidate function $f(x; \theta)$ makes use of image information which is available at test time. The parameter $\theta$ for the function f (x; θ) is randomly generated during training. The process for generating the parameter θ can comprise generating random spatial offset values in the form of a two or three dimensional displacement. The result of the function f (x; θ) is then computed by observing the depth (or intensity value) value for one or more test image elements which are displaced from the image element of interest x in the image by spatial offsets. The spatial offsets are optionally made depth invariant by scaling by 1/depth of the image element of interest. Where red green blue (RGB) images are used the result of the function f (x; θ) may be computed by observing the intensity value in a specified one of the red, green or blue color channel for one or more test image elements which are displaced from the image element of interest x in the image by spatial offsets.

The result of the binary test performed at a root node or split node determines which child node an image element is passed to. For example, if the result of the binary test is true, the image element is passed to a first child node, whereas if the result is false, the image element is passed to a second child node.

The random set of test parameters generated comprise a plurality of random values for the function parameter θ and the threshold values ξ and τ. In order to inject randomness into the decision trees, the function parameters θ of each split node are optimized only over a randomly sampled subset Θ of all possible parameters. This is an effective and simple way of injecting randomness into the trees, and increases generalization.

Then, combinations of test parameters are applied 612 to each image element in the set of training images. In other words, available values for θ (i.e. $\theta_i \in \Theta$) are tried one after the other, in combination with available values of ξ and τ for each image element in each training image. For each combination, criteria (also referred to as objectives) are calculated 614. The combination of parameters that optimize the criteria is selected 614 and stored at the current node for future use.

In an example the objective is a reduction-in-variance objective expressed as follows:

$$Q(S_n, \theta) = V(S_n) - \sum_{d \in \{L, R\}} \frac{|S_n^{d(\theta)}|}{|S_n|} V(S_n^d(\theta))$$

Which may be expressed in words as the reduction in variance of the training examples at split node n, with weak learner parameters θ equal to the variance of all the training examples which reach that split node minus the sum of the variances of the training examples which reach the left and right child nodes of the split node. The variance may be calculated as:

$$V(S) = \frac{1}{|S|} \sum_{(p,m) \in S} \|m - \overline{m}\|_2^2$$

Which may be expressed in words as, the variance of a set of training examples S equals the average of the differences between the training examples m and the mean of the training examples in S.

As an alternative to a reduction-in-variance objective, other criteria can be used, such as logarithm of the determinant, or the continuous information gain.

It is then determined 616 whether the value for the calculated criteria is less than (or greater than) a threshold. If the value for the calculated criteria is less than the threshold, then this indicates that further expansion of the tree does not provide significant benefit. This gives rise to asymmetrical trees which naturally stop growing when no further nodes are beneficial. In such cases, the current node is set 618 as a leaf node. Similarly, the current depth of the tree is determined (i.e. how many levels of nodes are between the root node and the current node). If this is greater than a predefined maximum value, then the current node is set 618 as a leaf node. Each leaf node has keypoint labels which accumulate at that leaf node during the training process as described below.

It is also possible to use another stopping criterion in combination with those already mentioned. For example, to assess the number of example image elements that reach the leaf. If there are too few examples (compared with a threshold for example) then the process may be arranged to stop to avoid overfitting. However, it is not essential to use this stopping criterion.

If the value for the calculated criteria is greater than or equal to the threshold, and the tree depth is less than the maximum value, then the current node is set 620 as a split node. As the current node is a split node, it has child nodes, and the process then moves to training these child nodes. Each child node is trained using a subset of the training image elements at the current node. The subset of image elements sent to a child node is determined using the parameters that optimized the criteria. These parameters are used in the binary test, and the binary test performed 622 on all image elements at the current node. The image elements that pass the binary test form a first subset sent to a first child node, and the image elements that fail the binary test form a second subset sent to a second child node.

For each of the child nodes, the process as outlined in blocks 610 to 622 of FIG. 6 are recursively executed 624 for the subset of image elements directed to the respective child node. In other words, for each child node, new random test parameters are generated 610, applied 612 to the respective subset of image elements, parameters optimizing the criteria selected 614, and the type of node (split or leaf) determined 616. If it is a leaf node, then the current branch of recursion ceases. If it is a split node, binary tests are performed 622 to determine further subsets of image elements and another branch of recursion starts. Therefore, this process recursively moves through the tree, training each node until leaf nodes are reached at each branch. As leaf nodes are reached, the process waits 626 until the nodes in all branches have been trained. Note that, in other examples, the same functionality can be attained using alternative techniques to recursion.

Once all the nodes in the tree have been trained to determine the parameters for the binary test optimizing the criteria at each split node, and leaf nodes have been selected to terminate each branch, then keypoint labels are accumulated 628 at the leaf nodes of the tree. This is the training stage and so particular image elements which reach a given leaf node have specified keypoint labels known from the ground truth training data. A representation of the keypoint labels may be stored 630 using various different methods. For example by aggregating the keypoint labels or storing statistics representing the distribution of keypoint labels.

In some embodiments a multi-modal distribution is fitted to the accumulated keypoint labels. Examples of fitting a multi-model distribution include using expectation maximization (such as fitting a Gaussian mixture model); using mean shift mode detection; using any suitable clustering process such as k-means clustering, agglomerative clustering or other clustering processes. Characteristics of the clusters or multi-modal distributions are then stored rather than storing the individual keypoint labels. In some examples a handful of the samples of the individual keypoint labels may be stored.

A weight may also be stored for each cluster or mode. For example, a mean shift mode detection algorithm is used and the number of keypoint labels that reached a particular mode may be used as a weight for that mode. Mean shift mode detection is an algorithm that efficiently detects the modes (peaks) in a distribution defined by a Parzen window density estimator. In another example, the density as defined by a Parzen window density estimator may be used as a weight. A Parzen window density estimator (also known as a kernel density estimator) is a non-parametric process for estimating a probability density function, in this case of the accumulated keypoint labels. A Parzen window density estimator takes a bandwidth parameter which can be thought of as controlling a degree of smoothing.

In an example a sub-sample of the training image elements that reach a leaf are taken and input to a mean shift mode detection process. This clusters the keypoint labels into a small set of modes. One or more of these modes may be stored for example, according to the number of examples assigned to each mode.

Once the accumulated keypoint labels have been stored it is determined 632 whether more trees are present in the decision forest. If so, then the next tree in the decision forest is selected, and the process repeats. If all the trees in the forest have been trained, and no others remain, then the training process is complete and the process terminates 634.

Therefore, as a result of the training process, one or more decision trees are trained using empirical training frames. Each tree comprises a plurality of split nodes storing optimized test parameters, and leaf nodes storing associated keypoint labels. Due to the random generation of parameters from a limited subset used at each node, and the possible subsampled set of training data used in each tree, the trees of the forest are distinct (i.e. different) from each other.

The training process may be performed in advance of using the trained prediction system to identify keypoint locations in 2D frames of captured sensor data. The decision forest and the optimized test parameters may be stored on a storage device for use in identifying keypoint locations in 2D frames at a later time.

Figure 7:
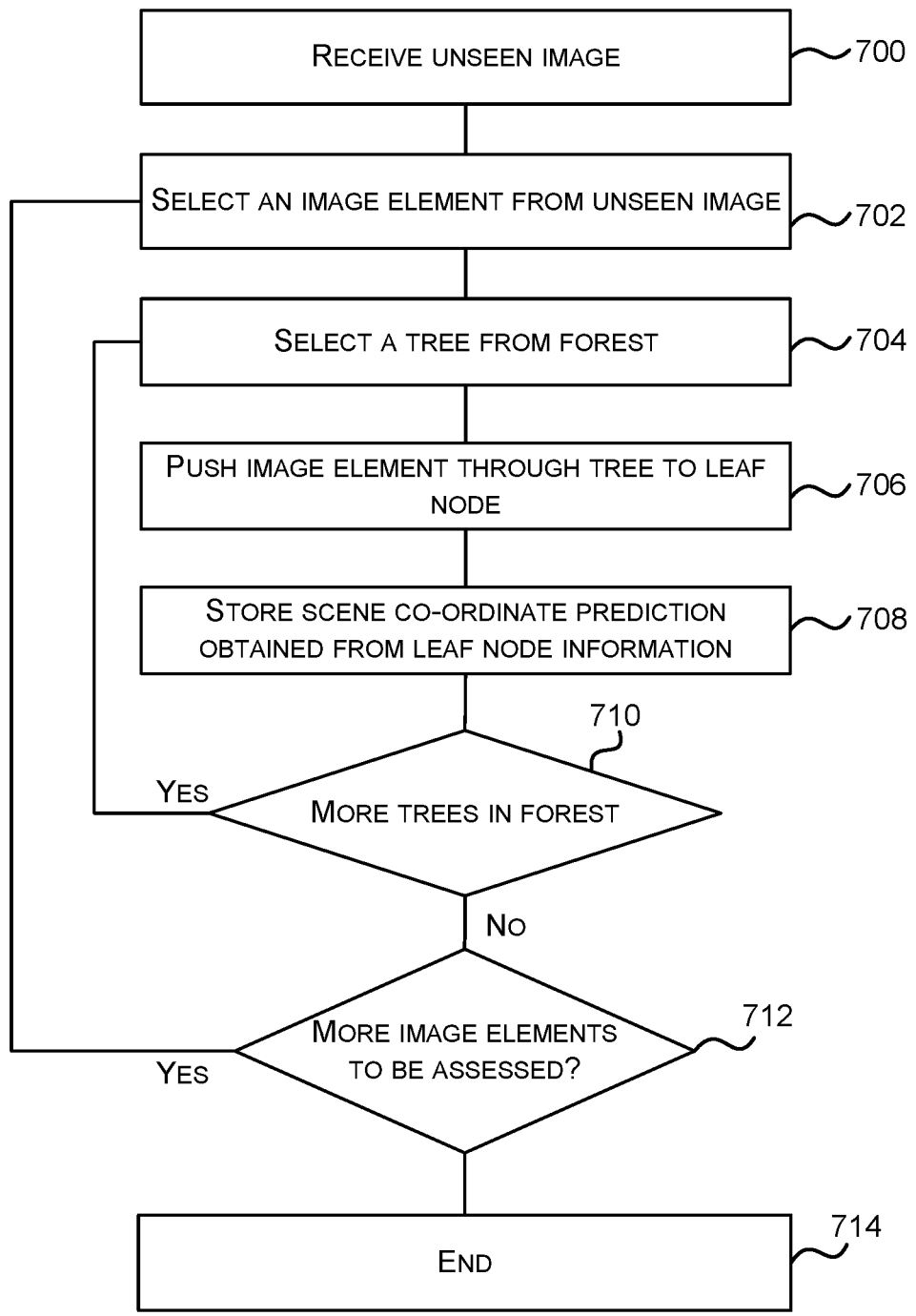
FIG. 7 is a flow diagram of a method of using a trained random decision forest to predict 2D positions of keypoints including floating keypoints.

FIG. 7 illustrates a flowchart of a process for predicting keypoint labels in a previously unseen image (a frame of captured sensor data) using a decision forest that has been trained as described with reference to FIG. 6. Firstly, an unseen image is received 700. An image is referred to as 'unseen' to distinguish it from a training frame which has the 2D keypoint positions already specified.

An image element from the unseen image is selected 702. A trained decision tree from the decision forest is also selected 704. The selected image element is pushed 706 through the selected decision tree, such that it is tested against the trained parameters at a node, and then passed to the appropriate child in dependence on the outcome of the test, and the process repeated until the image element reaches a leaf node. Once the image element reaches a leaf node, the accumulated keypoint labels (from the training stage) associated with this leaf node are stored 708 for this image element. In an example where the leaf node stores one or more modes of a distribution of keypoint labels, one or more of those modes are stored for this image element.

If it is determined 710 that there are more decision trees in the forest, then a new decision tree is selected 704, the image element pushed 706 through the tree and the accumulated keypoint labels stored 708. This is repeated until it has been performed for all the decision trees in the forest. The final prediction of the forest for an image element may be an aggregate of the keypoint labels obtained from the leaf found at each tree. Where one or more modes of a distribution of keypoint labels are stored at the leaves, the final prediction of the forest may be a union of the modes from the leaf found at each tree. Note that the process for pushing an image element through the plurality of trees in the decision forest can also be performed in parallel, instead of in sequence as shown in FIG. 7.

It is then determined 712 whether further unanalyzed image elements are to be assessed, and if so another image element is selected and the process repeated.

Figure 8:
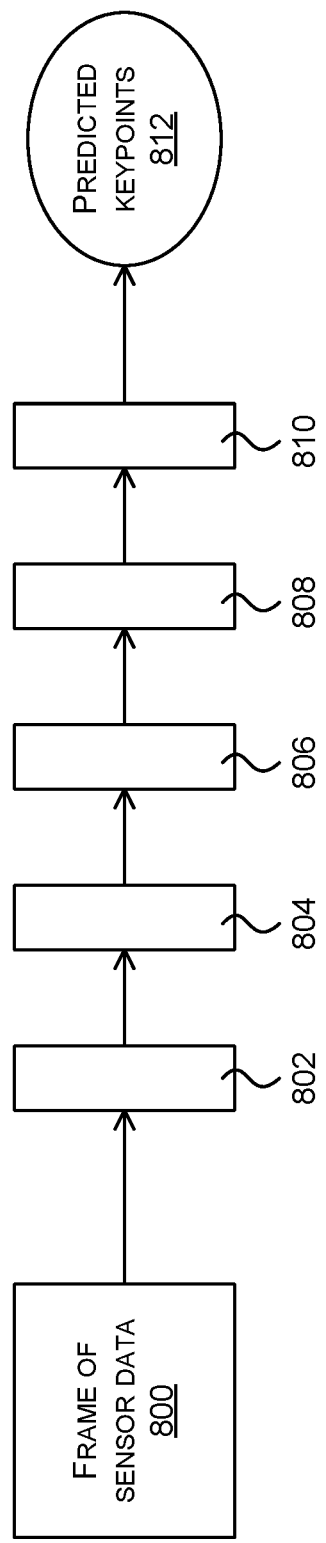
FIG. 8 is a schematic diagram of a neural network for predicting 2D positions of keypoints including floating keypoints.

In another example, the trained machine learning system comprises a neural network such as a convolutional neural network (CNN) or other type of neural network. There is a set of specified keypoints with known locations relative to the object and expressed in object coordinates. FIG. 8 is a schematic diagram of an example convolutional neural network architecture which is used in some cases but which is not intended to limit the scope of the technology. The input to the neural network is a frame of sensor data 800 so that the first layer 802 of the neural network comprises a three dimensional array of nodes which holds raw pixel values of the frame of sensor data, such as an image with three color channels. A second layer 804 of the neural network comprises a convolutional layer. It computes outputs of nodes that are connected to local regions in the input layer 802. Although only one convolution layer 804 is shown in FIG. 8, in some examples, there are a plurality of convolution layers connected in series, such as 5 to 20 convolutional layers. A third layer 806 of the neural network comprises a rectified linear unit (RELU) layer which applies an activation function. A fourth layer of the neural network 808 is a pooling layer which computes a downsampling and a fifth layer of the neural network 810 is a fully connected layer to compute a probability map 812 corresponding to the frame of sensor data, where each image element location in the probability map indicates a probability that the image element depicts each of the specified keypoints.

To train the neural network a well known backpropagation algorithm is used whereby labeled training frames are passed through the network to compute a probability map, an error between the predicted probability map and a ground truth probability map (known from the training data) is computed, and used to update weights of the neural network in a backpropagation process by computing an optimization of a loss function. Any well-known optimizer is used such as the Adam optimizer with any suitable learning rate.

Once the neural network has been trained it is used to compute probability maps for incoming frames of captured sensor data. The probability maps contain the predicted 2D positions of the keypoints. In order to compute a probability map a frame of sensor data is input to the first layer 802 of the neural network and processed through each layer to generate a probability map.

Figure 9:
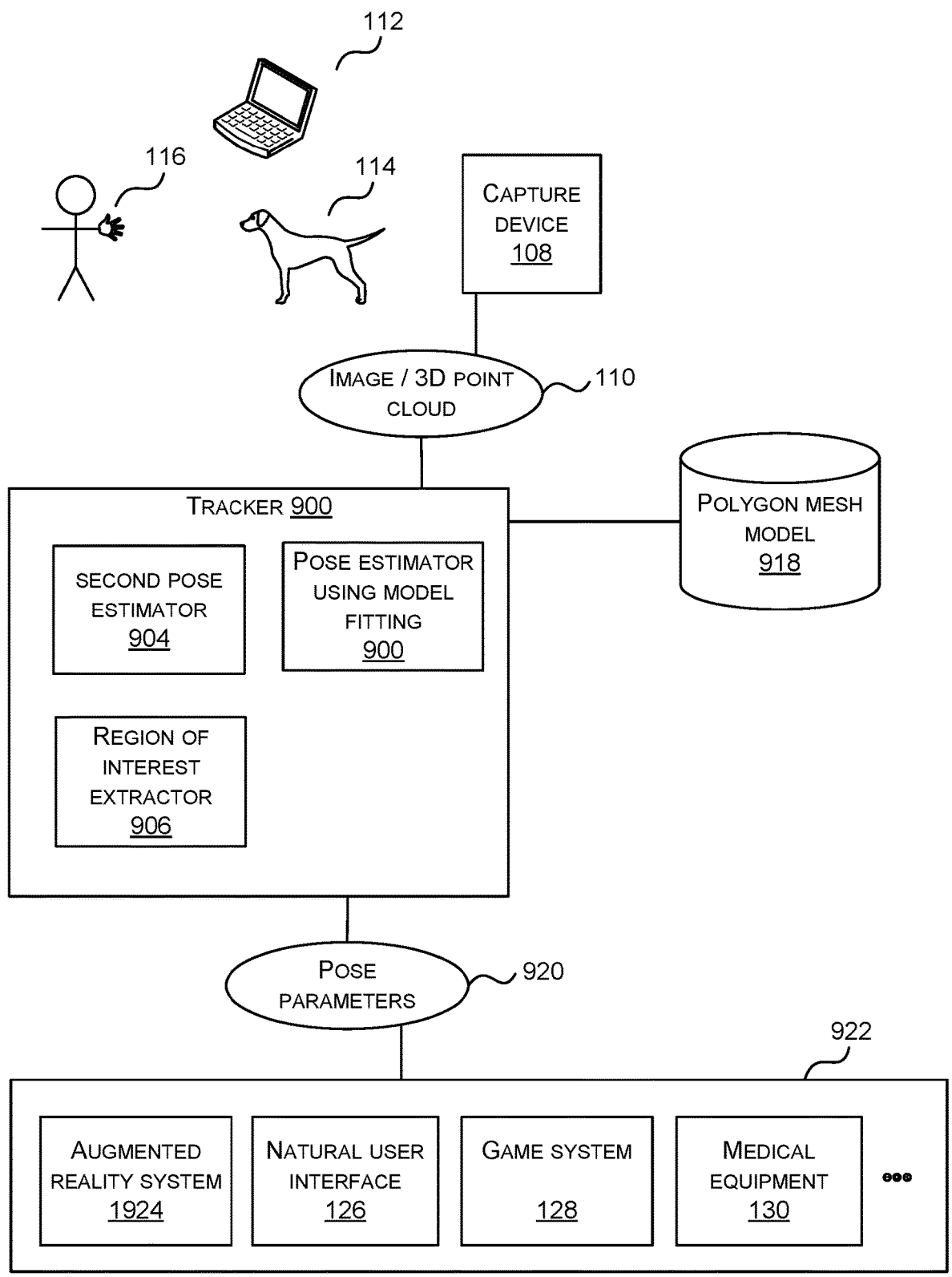
FIG. 9 is a schematic diagram of a pose tracker.

FIG. 9 is a schematic diagram of a tracker for tracking high dimensional pose of an articulated object such as a hand, laptop computer, dog or other articulated object. The pose is high dimensional because in addition to the 6 degrees of freedom being the position and orientation of the object (as in the situation of FIG. 1) values of additional parameters are computed such as joint positions and/or shape parameters. In some cases there are 20 or more parameters for which values are to be computed. The tracker 900 receives a stream of frames of captured sensor data depicting an object.

Various components in FIG. 9 are the same as in FIG. 1. In addition there is a polygon mesh model 910 of a generic instance of a class of object for which high dimensional pose is to be detected. A tracker 900 comprises a pose estimator 900 which uses model fitting and a second pose estimator 904. The second pose estimator 904 is the apparatus 102 of FIG. 1. There is also a region of interest extractor 906 which extracts regions of interest from the frames of captured sensor data 110. The pose estimator using model fitting 900 is implemented using technology as described in U.S. patent application Ser. No. 14/982,878 filed on 29 Dec. 2015 and published as US2017018165.

The output of the tracker is a stream of pose parameter values 920 where the pose parameter values are high dimensional having more than 6 dimensions. The pose parameter values 920 are input to a downstream system 922 as illustrated in FIG. 9.

The position and orientation computed from the keypoints using the second pose estimator 904 is used by the tracker 900 as described with reference to FIG. 10.

Figure 10:
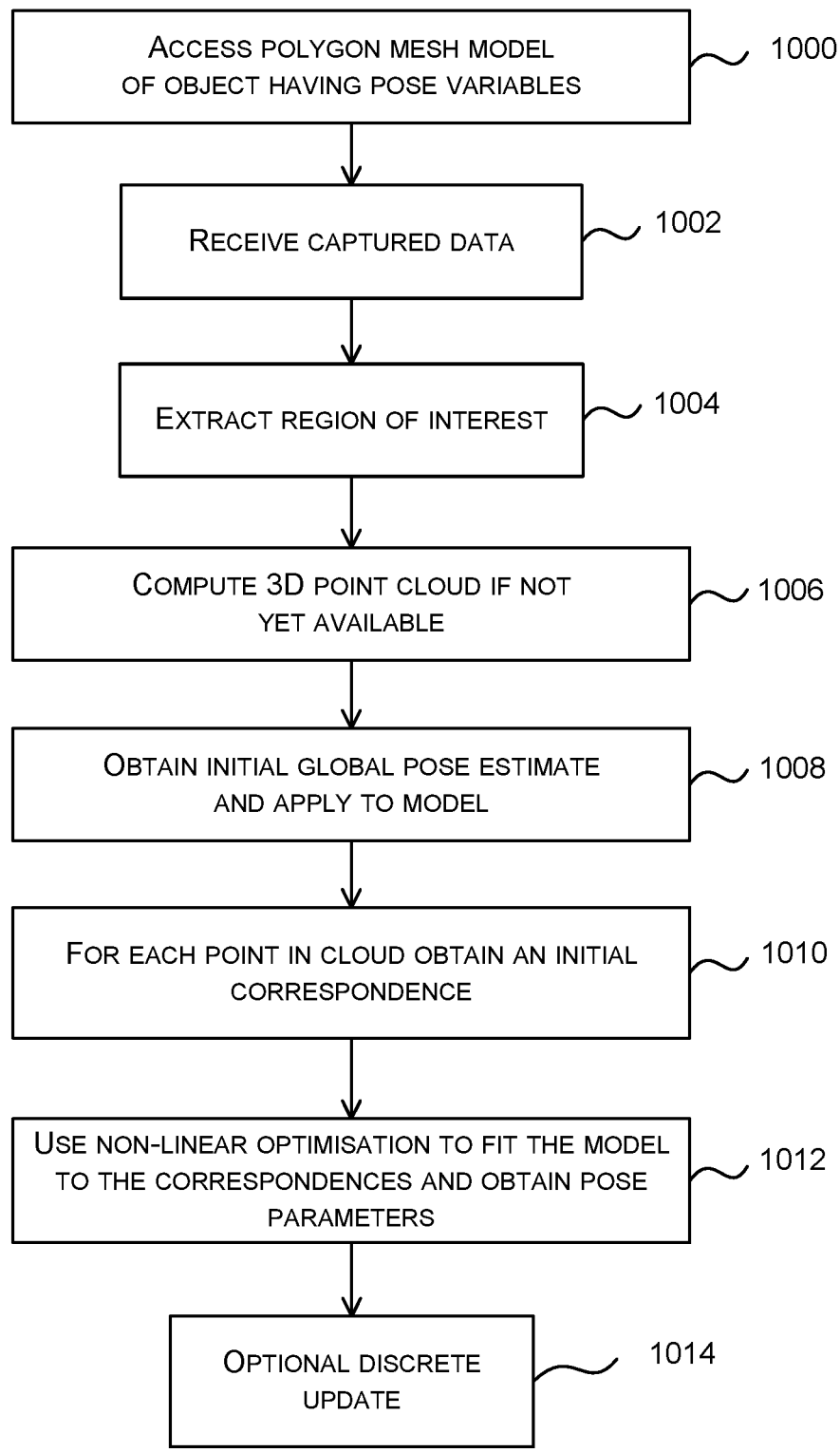
FIG. 10 is a flow diagram of a method of operation of the pose tracker of FIG. 9.

FIG. 10 is a flow diagram of an example method of operation at the tracker of FIG. 9. The tracker accesses 1000 the rigged polygon mesh model of the articulated object. For example, in the case that the aim is to track a laptop computer the tracker accesses 1000 a rigged polygon mesh model of a generic laptop.

The tracker receives captured data 1002 depicting the object to be tracked. For example, the captured data 1002 is a 3D point cloud, a depth map, one or more frames of raw time of flight data, color image data or other captured data depicting the object to be tracked. Optionally the tracker extracts 1004 a region of interest from the captured data where the region of interest depicts the object to be tracked rather than other parts of the scene or environment in which the object is present. For example, the tracker uses machine learning technology or image analysis to extract a region of interest of the captured data depicting the object to be tracked. The region of interest may or may not be contiguous.

In some examples, where the region of interest comprises parts of a depth map, the tracker computes 1006 a 3D point cloud by back projecting the region of interest. In some cases a 3D point cloud is already available. In some cases no 3D point cloud is used.

The tracker obtains 1008 an initial global pose estimate (which is six degree of freedom position and orientation) by using the apparatus 102 of FIG. 1 and applies it to the model. By using keypoints, including floating keypoints, the initial pose estimate is obtained in a fast, efficient and accurate manner.

Optionally the tracker obtains 1010 initial correspondence estimates. A correspondence estimate is an indication of a 3D point on the surface of the model corresponding to a captured data point.

In some examples a correspondence is a tuple of values denoted by the symbol u in this document, which specifies a point on a surface referred to herein as a Phong surface, which is an approximation to a smooth surface derived from the rigged polygon mesh but without the need for computing a limit surface. A defining function S is stored at the tracker in some examples and is a function which takes as its input a correspondence u and the pose parameters θ. The defining function S computes a 3D position in the world that point u on the Phong surface corresponds to. In an example, polygon indices are stored on disk, and the defining function S which is implemented in code, is also stored on disk. The defining function S uses the polygon indices alongside the mesh posing implementation to evaluate the surface by interpolating between the vertices given by the polygon indices.

The tracker obtains 1010 a plurality of initial correspondence estimates, for example, one for each point in the point cloud, or one for each of a plurality of captured data points. The tracker obtains 1010 the initial correspondence estimates by selecting them at random or by using machine learning, or by choosing a closest point on the model given the initial estimate of the global pose, using combinations of one or more of these approaches, or in other ways. In the case that machine learning is used a machine learning system has been trained using a large amount of training data to derive a direct transformation from image data to 3D model points.

The tracker computes an optimization 1012 to fit the model to the captured data. For example, the tracker computes the following minimization beginning from the initial values of the correspondence estimates and the pose parameters where these are available (or beginning from randomly selected values)

$$\min_{\theta, u_1, \ldots u_n} \sum_{i=1}^{n} \psi(\|x_i - S(u_i; \theta)\|) + \psi^\top(\|x_i^\top - S^\top(u_i; \theta)\|)$$

Which is expressed in words as a minimum over the pose parameters θ and n values of the correspondences u of the sum of a robust kernel ψ(•) applied to the magnitude of the difference between a 3D point cloud point $x_i$ and a corresponding 3D surface point $S(u_i; \theta)$, and a different robust kernel $\psi^T(•)$ applied to the magnitude of the difference between a 3D point cloud normal $x_i^T$ and a corresponding 3D surface normal $S^T(u_i; \theta)$. The 3D surface point in this equation lies on a rigged polygon mesh, while the 3D surface normal is an approximation to the geometric normal of a smooth surface such as a subdivision surface. The surface, referred to herein as a Phong surface, is not computed in its entirety; rather particular parts of the Phong surface are computed as and when needed. The corresponding 3D surface points given by $S(u_i; \theta)$, and the corresponding 3D surface normals $S^T(u_i; \theta)$ are efficient to compute in the approximate (Phong) surface case. The 3D Phong surface normal is computed by computing approximate surface normals along it as described in detail with reference to FIGS. 4 to 6. Where the robust kernels ψ(•) and $\psi^T(•)$ are a Geman-McClure kernel, a Huber kernel, a Quadratic kernel or other kernel.

The optimization enables correspondence estimation and model fitting to be unified since the minimization searches over possible values of the correspondences u and over possible values of the pose parameters θ. This is found to give better results than an alternative approach of using alternating stages of model fitting and correspondence estimation.

The optimization is non-linear in some examples. The result of the optimization is a set of values of the pose parameters θ including the global pose parameters and the joint positions.

Because the model has a continuous normal approximation it is possible to compute the optimization using a non-linear optimization process. For example, a gradient-based process which exploits the fact that rate of change of both surface position and surface orientation does not change substantially across edges in a good approximation to a smooth surface, such as the Phong surface. Jacobian optimization methods are used in some examples. This improves speed of processing. A discrete update operation is optionally used together with the optimization. This involves using the continuous optimization as mentioned above to update both the pose and the correspondences together, and then using a discrete update to re-set the values of the correspondences using the captured sensor data. The discrete update allows the correspondences to jump efficiently from one part of the object surface to another, for example, from one finger-tip to the next.

The process of FIG. 10 is optionally repeated, for example as new captured data arrives as part of a stream of captured data. In some examples the process of FIG. 10 is arranged to include reinitialization whereby the pose parameters used at the beginning of the optimization are obtained from the second pose estimator 904 which uses keypoints including at least one floating keypoint. Reinitialization occurs according to various criteria such as at specified time intervals, at specified intervals of instances of captured data, according to user input, according to error metrics which indicate error in the pose values or in other ways.

When the apparatus 102 of FIG. 1 is used as the second pose estimator 904 as described with reference to FIG. 10 there is a 27% improvement in accuracy of median joint position as compared with using a second pose estimator 904 which computes position of the object but not orientation of the object.

Figure 11:
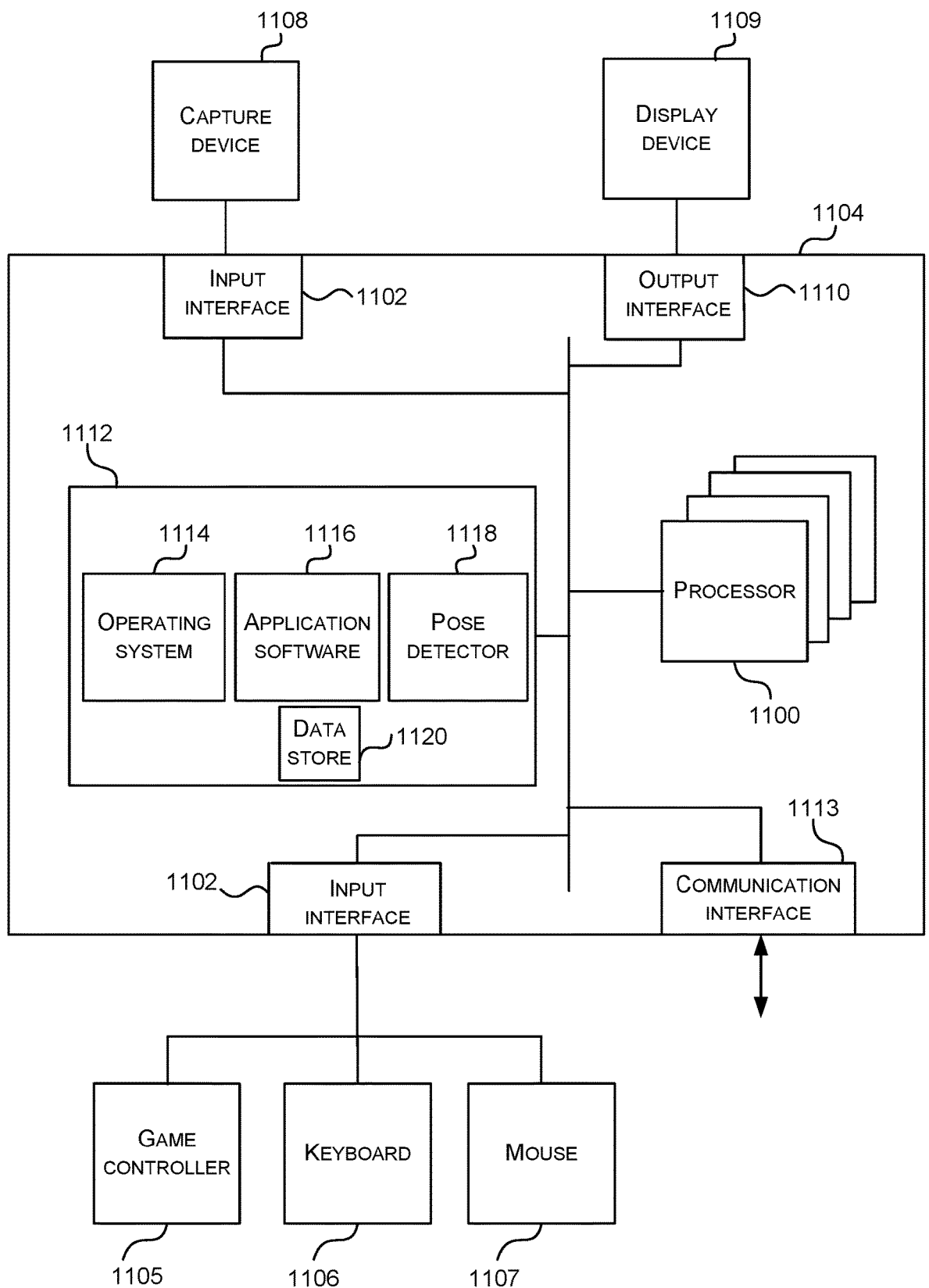
FIG. 11 illustrates an exemplary computing-based device in which embodiments of a pose detector are implemented.

FIG. 11 illustrates various components of an exemplary computing-based device 1004 which may be implemented as any form of a computing and/or electronic device, and in which embodiments of an object pose (i.e. position and orientation) detector is implemented.

Computing-based device 1104 comprises one or more processors 1100 which are microprocessors, controllers or any other suitable type of processors for processing computer executable instructions to control the operation of the device in order to compute values of pose parameters which are 6 degree of freedom position and orientation of an object. In some examples, for example where a system on a chip architecture is used, the processors 1100 include one or more fixed function blocks (also referred to as accelerators) which implement a part of the method of computing values of pose parameters in hardware (rather than software or firmware). Platform software comprising an operating system 1114 or any other suitable platform software is provided at the computing-based device to enable application software 1116 to be executed on the device. A data store 1120 holds 3D keypoint positions, predicted 2D positions of points in frames of sensor data which depict a keypoint, probability maps, position and orientation values and other data. A pose detector 1118 implements the method of FIG. 3 to compute position and orientation of an object in world coordinates using at least one floating keypoint.

The computer executable instructions are provided using any computer-readable media that is accessible by computing based device 1104. Computer-readable media includes, for example, computer storage media such as memory 1112 and communications media. Computer storage media, such as memory 1112, includes volatile and non-volatile, removable and non-removable media implemented in any method or technology for storage of information such as computer readable instructions, data structures, program modules or the like. Computer storage media includes, but is not limited to, random access memory (RAM), read-only memory (ROM), erasable programmable read only memory (EPROM), electrically erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is usable to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1112) is shown within the computing-based device 1104 it will be appreciated that the storage is optionally distributed or located remotely and accessed via a network or other communication link (e.g. using communication interface 1113).

The computing-based device 1104 comprises one or more input interfaces 1102 arranged to receive and process input from one or more devices, such as user input devices (e.g. capture device 1108, a game controller 1105, a keyboard 1106, a mouse 1107). This user input may be used to control software applications and/or for object pose tracking. For example, capture device 1108 may be a mobile depth camera arranged to capture depth maps of a scene. It may also be a fixed depth camera arranged to capture depth maps of an object. In another example, capture device 1108 comprises both a depth camera and an RGB camera. In some examples the computing-based device 1104 is arranged to provide object pose tracking at interactive rates.

The computing-based device 1104 also comprises an output interface 1110 arranged to output display information to a display device 1109 which can be separate from or integral to the computing device 1104. The display information may provide a graphical user interface. In an example, the display device 1109 may also act as the user input device if it is a touch sensitive display device. The output interface 1110 may also output date to devices other than the display device, e.g. a locally connected printing device.

In some examples the user input devices 1105, 1107, 1108, 1109 may detect voice input, user gestures or other user actions and may provide a natural user interface (NUI). This user input may be used to control a game or other application. The output interface 1110 may also output data to devices other than the display device, e.g. a locally connected printing device.

The input interface 1102, output interface 1110, display device 1109 and optionally the user input devices 1105, 1107, 1108, 1109 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Alternatively or in addition to the other examples described herein, examples include any combination of the following:

Clause A. An apparatus for detecting three dimensional position and orientation of an object, the apparatus comprising:

a memory storing at least one frame of captured sensor data depicting the object;

a trained machine learning system configured to receive the frame of the sensor data and to compute a plurality of two dimensional positions in the frame, each predicted two dimensional position being of sensor data in the frame depicting a keypoint, where a keypoint is a pre-specified 3D position relative to the object, at least one of the keypoints being a floating keypoint depicting a pre-specified position relative to the object, lying inside or outside the object's surface;

a pose detector which computes the three dimensional position and orientation of the object using the predicted two dimensional positions and outputs the computed three dimensional position and orientation. By using at least one floating keypoint significant improvements in accuracy are found since the floating keypoint enables ambiguities in orientation to be discriminated between. By using a trained machine learning system to predict the 2D locations in the frame which depict the keypoints, including the floating keypoint, an efficient and accurate way of finding those 2D locations is given. In contrast previous approaches have used image analysis to search for visual features in the image to identify keypoints and these approaches do not work for floating keypoints. Previously keypoints outside the object to be tracked have been considered a disadvantage or error to be avoided. Note that in some cases all the keypoints are floating keypoints. In some cases there is a mixture of regular and floating keypoints.

Clause B. The apparatus of clause A comprising an object tracker for tracking position and orientation of the object from a stream of captured sensor data by using the trained machine learning system to predict two dimensional positions of the keypoints in each of a plurality of frames of the stream of captured sensor data. Because using keypoints to compute position and orientation is efficient, and because the machine learning system is efficient, it is possible to track position and orientation in real time, even for resource constrained deployments such as smart phones and wearable computers.

The apparatus of clause B wherein the apparatus is configured to compute the three dimensional position and orientation of the object at a rate substantially equal to a frame rate at which the sensor data is captured.

Clause C the apparatus of clause A or clause B wherein the trained machine learning system is a random decision forest.

Clause D The apparatus of clause A or clause B wherein the trained machine learning system is a neural network.

Clause E The apparatus of any of clauses A to D wherein the trained machine learning system has been trained with frames of sensor data for which two dimensional positions of points depicting the keypoints are known. This gives the benefit of a machine learning system which is able to make accurate predictions.

Clause F The apparatus of any of clauses A to E wherein the trained machine learning system has been trained with frames of sensor data captured from real world objects having a physical marker extending from the object to denote a floating keypoint.

Clause G The apparatus of any of clauses A to F wherein the trained machine learning system has been trained with synthetic frames of sensor data generated by rendering from a 3D model of the object in different positions and orientations.

Clause H. The apparatus of any of clauses A to G wherein the trained machine learning system has been trained with frames of sensor data depicting the object as partially occluded.

Clause I The apparatus of any of clauses A to H wherein there are at least four keypoints per frame and the pose detector is configured to compute the position and orientation using a closed form solution. This is a particularly efficient way of computing the position and orientation.

Clause J The apparatus of any of clauses A to H wherein there are a plurality of keypoints per frame and the pose detector is configured to compute the position and orientation by minimizing an energy function.

Clause K The apparatus of any of clauses A to J further comprising an articulated object tracker, for tracking position, orientation and additional parameters of the object, where the object is an articulated object, and wherein the computed three dimensional position and orientation is used to initialize a 3D model of the articulated object prior to fitting the frame of sensor data to the 3D model. This is found to give particularly good improvements in accuracy of the position, orientation and the additional parameters.

Clause L The apparatus of any of clauses A to K wherein the object is a hand and wherein the floating keypoint is spaced over the side of the hand opposite the palm and generally perpendicular to a center of mass of the hand. Having a floating keypoint at this location is found to be particularly effective.

Clause M The apparatus of any of clauses A to K wherein the object is a human body and wherein the floating keypoint is spaced in front of a torso of the body and generally perpendicular to a center of mass of the body. Having a floating keypoint at this location is found to be particularly effective.

Clause N A computer-implemented method of detecting three dimensional position and orientation of an object, the method comprising:

storing, at a memory, at least one frame of captured sensor data depicting the object;

using a trained machine learning system to compute a plurality of two dimensional positions in the frame, each predicted two dimensional position being of sensor data in the frame depicting a keypoint, where a keypoint is a pre-specified 3D position relative to the object, at least one of the keypoints being a floating keypoint depicting a pre-specified position relative to the object, lying inside or outside the object's surface;

computing the three dimensional position and orientation of the object using the predicted two dimensional positions and outputting the computed position and orientation.

Clause O The method of clause N comprising training the machine learning system using training data comprising synthetically generated frames of sensor data for which two dimensional keypoint positions are known and where at least one of the keypoints is a floating keypoint.

Clause P The method of clause N or clause O wherein the at least one floating keypoint is located generally over a center of mass of the object.

Clause Q The method of any of clauses N to P further comprising initializing a 3D model of an articulated object prior to fitting the frame of sensor data to the 3D model to compute more than 6 parameters of the 3D model.

Clause R The method of any of clauses N to Q comprising computing the three dimensional position and orientation of the object at a rate substantially equal to a frame rate at which the sensor data is captured.

Clause S One or more device-readable media with device-executable instructions that, when executed by a computing system, direct the computing system to perform operations comprising:

storing, at a memory, at least one frame of captured sensor data depicting the object;

initiating a trained machine learning system to compute a plurality of two dimensional positions in the frame, each predicted two dimensional position being of sensor data in the frame depicting a keypoint, where a keypoint is a pre-specified 3D position relative to the object, at least one of the keypoints being a floating keypoint depicting a pre-specified position relative to the object, lying inside or outside the object's surface; and computing the three dimensional position and orientation of the object using the predicted two dimensional positions using and outputting the computed position and orientation.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. An apparatus for detecting three dimensional position and orientation of an object, the apparatus comprising:
   a memory storing at least one frame of captured sensor data depicting the object;
   a trained machine learning system configured to receive the frame of the sensor data and to compute a plurality of two dimensional positions in the frame, each predicted two dimensional position being of sensor data in the frame depicting a keypoint, where a keypoint is a pre-specified 3D position on a surface of the object, at least one of the keypoints being a floating keypoint depicting a pre-specified fixed position relative to the object, lying inside or outside the surface of the object at a pre-defined fixed distance from the surface of the object;
   a pose detector which computes the three dimensional position and orientation of the object using the predicted two dimensional positions and outputs the computed three dimensional position and orientation.

2. The apparatus of claim 1 comprising an object tracker for tracking position and orientation of the object from a stream of captured sensor data by using the trained machine learning system to predict two dimensional positions of the keypoints in each of a plurality of frames of the stream of captured sensor data.

3. The apparatus of claim 1 wherein the apparatus is configured to compute the three dimensional position and orientation of the object based on a rate the sensor data is captured.

4. The apparatus of claim 1 wherein the trained machine learning system is a random decision forest.

5. The apparatus of claim 1 wherein the trained machine learning system is a neural network.

6. The apparatus of claim 1 wherein the trained machine learning system has been trained with frames of sensor data for which two dimensional positions of points depicting the keypoints are known.

7. The apparatus of claim 1 wherein the trained machine learning system has been trained with frames of sensor data captured from real world objects having a physical marker extending from the object to denote a floating keypoint.

8. The apparatus of claim 1 wherein the trained machine learning system has been trained with synthetic frames of sensor data generated by rendering from a 3D model of the object in different positions and orientations.

9. The apparatus of claim 1 wherein the trained machine learning system has been trained with frames of sensor data depicting the object as partially occluded.

10. The apparatus of claim 1 wherein there are at least four keypoints per frame and the pose detector is configured to compute the position and orientation using a closed form solution.

11. The apparatus of claim 1 wherein there are a plurality of keypoints per frame and the pose detector is configured to compute the position and orientation by minimizing an energy function.

12. The apparatus of claim 1 further comprising an articulated object tracker, for tracking position, orientation and additional parameters of the object, where the object is an articulated object, and wherein the computed three dimensional position and orientation is used to initialize a 3D model of the articulated object prior to fitting the frame of sensor data to the 3D model.

13. The apparatus of claim 1 wherein the object is a hand and wherein the floating keypoint is spaced over the side of the hand opposite the palm and generally perpendicular to a center of mass of the hand.

14. The apparatus of claim 1 wherein the object is a human body and wherein the floating keypoint is spaced in front of a torso of the body and generally perpendicular to a center of mass of the body.

15. A computer-implemented method of detecting three dimensional position and orientation of an object, the method comprising:
    storing, at a memory, at least one frame of captured sensor data depicting the object;
    using a trained machine learning system to compute a plurality of two dimensional positions in the frame, each predicted two dimensional position being of sensor data in the frame depicting a keypoint, where a keypoint is a pre-specified 3D position on a surface of the object, at least one of the keypoints being a floating keypoint depicting a pre-specified fixed position relative to the object, lying inside or outside the surface of the object at a pre-defined fixed distance from the surface of the object;
    computing the three dimensional position and orientation of the object using the predicted two dimensional positions and outputting the computed position and orientation.

16. The method of claim 15 comprising training the machine learning system using training data comprising synthetically generated frames of sensor data for which two dimensional keypoint positions are known and where at least one of the keypoints is a floating keypoint.

17. The method of claim 15 wherein the at least one floating keypoint is not on a surface of any object.

18. The method of claim 15 further comprising initializing a 3D model of an articulated object prior to fitting the frame of sensor data to the 3D model to compute more than 6 parameters of the 3D model.

19. The method of claim 15 comprising computing the three dimensional position and orientation of the object at a rate substantially equal to a frame rate at which the sensor data is captured.

20. One or more device-readable media with device-executable instructions that, when executed by a computing system, direct the computing system to perform operations comprising:
    storing, at a memory, at least one frame of captured sensor data depicting the object;
    initiating a trained machine learning system to compute a plurality of two dimensional positions in the frame, each predicted two dimensional position being of sensor data in the frame depicting a keypoint, where a keypoint is a pre-specified 3D position on a surface of the object, at least one of the keypoints being a floating keypoint depicting a pre-specified fixed position relative to the object, lying inside or outside the surface of the object at a pre-defined fixed distance from the surface of the object; and
    computing the three dimensional position and orientation of the object using the predicted two dimensional positions using and outputting the computed position and orientation.

\* \* \* \* \*